(12) United States Patent
Tanahashi et al.

(10) Patent No.: US 11,076,622 B2
(45) Date of Patent: Aug. 3, 2021

(54) METHOD FOR PRODUCING FRIED NOODLE LUMP

(71) Applicant: NISSIN FOODS HOLDINGS CO., LTD., Osaka (JP)

(72) Inventors: Maiko Tanahashi, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 15/027,928

(22) PCT Filed: Oct. 9, 2014

(86) PCT No.: PCT/JP2014/077031
§ 371 (c)(1),
(2) Date: Apr. 7, 2016

(87) PCT Pub. No.: WO2015/053350
PCT Pub. Date: Apr. 16, 2015

(65) Prior Publication Data
US 2016/0249654 A1    Sep. 1, 2016

(30) Foreign Application Priority Data

Oct. 9, 2013    (JP) .............................. JP2013-212144

(51) Int. Cl.
*A23L 5/00*    (2016.01)
*A23L 7/00*    (2016.01)
(Continued)

(52) U.S. Cl.
CPC ................. *A23L 7/111* (2016.08); *A23L 5/11* (2016.08); *A23L 7/113* (2016.08); *A23V 2002/00* (2013.01)

(58) Field of Classification Search
CPC ........ A21D 10/02; A47J 37/00; A47J 37/1214; A47J 37/1219; A23L 7/109; A23L 1/1613;
(Continued)

(56) References Cited

U.S. PATENT DOCUMENTS 3,997,676 A * 12/1976 Ando ...................... A23L 7/111
426/113
4,166,139 A * 8/1979 Ishida ...................... A21B 5/08
426/115
(Continued)

FOREIGN PATENT DOCUMENTS

FR    2 351 600    12/1977
JP    50-004269    1/1975
(Continued)

OTHER PUBLICATIONS

Santa Cruz et al. "Protein Enrichment of Oriental Noodles Based on Canna Edulis Starch." Jun. 30, 2012. Revista Bolivian de Quimica. vol. 29, No. 1. pp. 97-110. (Year: 2012).*
(Continued)

*Primary Examiner* — Ericson M Lachica
(74) *Attorney, Agent, or Firm* — Hamre, Schumann, Mueller & Larson, P.C.

(57) ABSTRACT

[Problem to be Solved] There is provided a fried noodle lump which is prevented from being inverted in a cup by external shock in a state where the fried noodle lump is stored in a cup-shaped container.
[Solution] The shape retention of a bottom end portion of the fried noodle lump is secured by storing a group of noodle strings after gelatinization in a retainer and frying the lower end portion of the group of noodle strings. Accordingly, the fried noodle lump can be prevented from being inverted in a cup by external shock in a state where the fried noodle lump is stored in a cup-shaped container. Further, it is preferred to include a step of immersing the whole of the
(Continued)

group of noodles strings in a fry oil, after the step of securing the shape retention of the bottom end portion of the fried noodle lump.

9 Claims, 3 Drawing Sheets

(51) Int. Cl.
 *A23L 7/109* (2016.01)
 *A23L 5/10* (2016.01)
 *A23L 7/113* (2016.01)

(58) Field of Classification Search
 CPC .. A23L 5/11; A23L 7/111; A23L 7/113; A21B 5/08
 See application file for complete search history.

(56) References Cited

U.S. PATENT DOCUMENTS

| | | | |
|---|---|---|---|
| 4,182,230 A | | 1/1980 | Sakurazawa |
| 5,419,240 A | * | 5/1995 | Morishita ........... A47J 37/1214 426/439 |
| 2013/0251875 A1 | * | 9/2013 | Minamitani ............ A23L 1/162 426/557 |

FOREIGN PATENT DOCUMENTS

| | | | |
|---|---|---|---|
| JP | 52-064445 | 5/1977 | |
| JP | 53-034941 | 3/1978 | |
| JP | 53-050350 | 5/1978 | |
| JP | 59-092689 | 6/1984 | |
| JP | 61-128854 | 6/1986 | |
| JP | 61-247350 | 11/1986 | |
| JP | 62-070791 | 5/1987 | |
| JP | 5-328923 | 12/1993 | |
| JP | 4904147 B | 3/2012 | |
| JP | WO 2012039495 A1 * | 3/2012 | ............. A23L 1/162 |

OTHER PUBLICATIONS

International Search Report issued in International Application No. PCT/JP2014/077031, dated Dec. 11, 2014, 4 pages.
Extended European Search Report issued in corresponding European Search Report dated Mar. 21, 2017, 10 pages.
Office Action issued in corresponding Japanese Patent Application No. 2015-541629, dated Nov. 12, 2018, 22 pages with an English translation.

* cited by examiner

TAPER ANGLE

TAPER ANGLE

TAPER ANGLE

METHOD FOR PRODUCING FRIED NOODLE LUMP

TECHNICAL FIELD

The present invention relates to a fried noodle lump which is prevented from being inverted even by physical shock during transport or storage in a state where the fried noodle lump is stored in a cup.

BACKGROUND ART

Instant cup noodles containing a fried noodle lump stored in a cup are an excellent processed food product that is preservable for a long period at ordinary temperature, easily cooked, and inexpensively provided. In the instant cup noodles, the fried noodle lump is often included in a form where the lateral side of the noodle lump is in contact with the internal lateral side of a cup-shaped container.

For such instant cup noodles, the following case, albeit rare, has been reported: the fried noodle lump is moved within the container due to the fracture of a lower portion of the noodle lump by unexpected physical shock from the outside of the container during distribution, etc.; and therefore, so-called inversion occurs (i.e., the noodle lump is inclined or the upper side and the underside are reversed).

If the fried noodle lump is inverted, dried ingredients or the like added to the top of the fried noodle lump sink to space below the noodle lump. Thus, the ingredients are buried under noodles even after reconstitution. Therefore, the appearance at the time of eating is deteriorated, leading to reduction in commercial value. A prior application that discloses a technique to solve such problems has not yet been found.

As a related prior technique, a packaged instant food product in a compact form is disclosed, wherein in a state where a noodle lump and ingredients or the like on the top of the noodle lump are placed, they are included in a deep-draw flexible packaging material under degassed conditions (Patent Literature 1). This packaged instant food product facilitates securing the position of the ingredients or the like. However, this approach has the following disadvantages: it is necessary to secure a capacity required for cooking by expanding the deep-draw package in a separately prepared cup-shaped container before eating; and the deep-draw flexible packaging material is required.

CITATION LIST

Patent Literature

Patent Literature 1: Japanese Patent No. 4904147

SUMMARY OF INVENTION

Technical Problem

An object of the present invention is to develop a technique capable of preventing a fried noodle lump from being inverted even by the application of unforeseeable stronger physical shock than expected during distribution of instant cup noodles.

Solution to Problem

In the steps of producing a fried noodle lump for use in instant fried noodles, a group of noodle strings prepared from a powder (e.g., wheat flour) and then cut is usually gelatinized by steaming and then subjected to an appropriate treatment such as flavoring. Then, the group of noodle strings is stored in a retainer, which is a porous mold. The retainer is immersed in a fry oil where the noodle strings are fried to prepare the fried noodle lump.

As a result of reviewing these steps, the present inventors have found that a fried noodle lump which is prevented from being inverted in a cup by external shock in a state where the fried noodle lump is included in a cup-shaped container can be obtained through the step of securing the shape retention of a bottom end portion of the fried noodle lump by storing a group of noodle strings after gelatinization in a retainer and frying the lower end portion of the group of noodle strings, regardless of subsequent steps, and the present inventors have consequently completed the present invention.

Specifically, the first aspect of the present invention relates to

"a method for producing a fried noodle lump which is prevented from being inverted in a cup by external shock in a state where the fried noodle lump is included in a cup-shaped container, comprising the step of:

securing the shape retention of a bottom end portion of the fried noodle lump by storing a group of noodle strings after gelatinization in a retainer and frying the lower end portion of the group of noodle strings".

It is preferred to adopt the step of immersing the whole retainer in a fry oil, after the step of securing the shape retention of a bottom end portion.

Specifically, the second aspect of the present invention relates to

"the method for producing a fried noodle lump according to the first aspect of the invention, further comprising the step of immersing the whole retainer in a fry oil, after the step of securing the shape retention of a bottom end portion of the fried noodle lump".

Furthermore, the applicant also intends a fried noodle lump produced by the method according to the first and second aspects of the invention. Specifically, the third aspect of the present invention relates to "a fried noodle lump produced by a production method according to the first and second aspects of the invention".

Advantageous Effects of Invention

The fried noodle lump of the present invention can be stored in a cup-shaped container and thereby prepared as instant cup noodles that can prevent inversion of the fried noodle lump.

BRIEF DESCRIPTION OF DRAWINGS

FIG. 1(a) shows a type having a round opening. FIG. 1(b) shows a type having a quadrangular opening. FIG. 1(c) shows a bowl-shaped type having a wide opening.

FIG. 2(a) shows a vertical-type cup. FIG. 2(b) shows a bowl-shaped cup.

REFERENCE SIGNS LIST

Figure 1A:
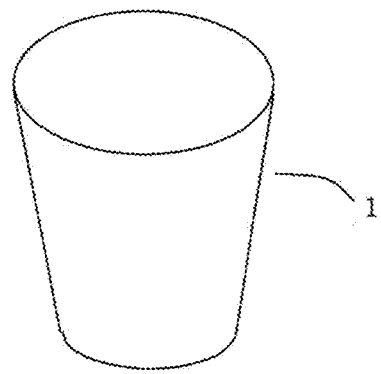
FIGS. 1(a) to 1(c) are perspective views showing an exemplary cup-shaped container.

1: cup-shaped container
2: fried noodle lump (group of noodle strings)
3: dried ingredients
4: powdered soup
5: retainer body
6: lid
7: fry oil

DESCRIPTION OF EMBODIMENTS

Hereinafter, modes for carrying out the present invention will be described. However, the present invention is not intended to be limited by these embodiments.

—Cup-Shaped Container—

Figure 1B:
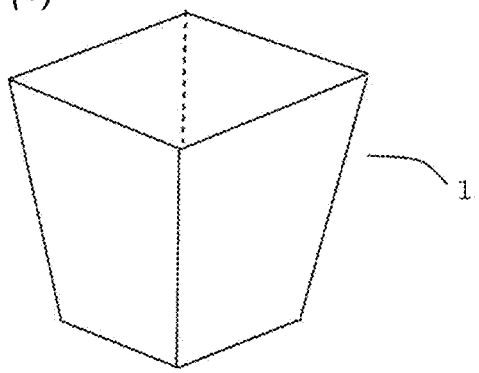
Figure 1C:
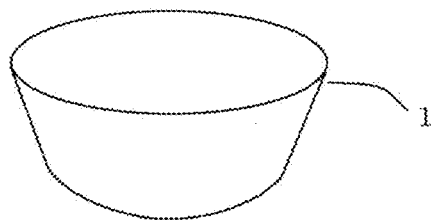

The cup-shaped container used in the present invention includes various forms. Its opening is typically round as shown in FIG. 1(*a*), though the shape of the opening is not limited thereto. A quadrangular opening shown in FIG. 1(*b*) or a pentagonal opening may be used. The cup-shaped container may be not only a vertical-type cup having a relatively small opening but a bowl-shaped container having a large opening as shown in FIG. 1(*c*), as a matter of course.

Figure 2A:
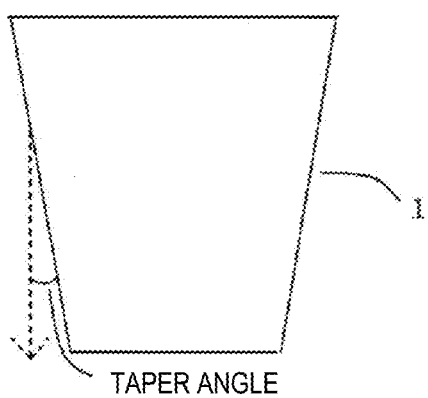
FIGS. 2(a) and 2(b) are front sectional views of an exemplary cup-shaped container.
Figure 2B:
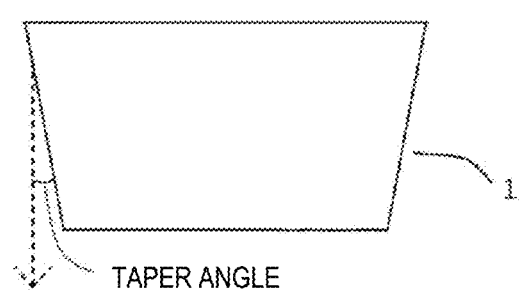

Particularly, as shown in FIGS. 2(*a*) and 2(*b*), a cup-shaped container whose barrel has a substantially tapered structure which becomes gradually wider toward the opening of the container can be preferably used. In this case, the taper angle is not particularly limited and is generally on the order of 3° to 15°.

A container of vertically long type can be preferably used as the cup-shaped container in the present invention, though the cup-shaped container used in the present invention is not limited thereto.

The material of the cup is not particularly limited. Various materials such as paper, polypropylene, and polyethylene terephthalate can be used. However, it is particularly preferred to use a polypropylene cup from the viewpoint of the effects of the present invention.

—Fried Noodle Lump—

The fried noodle lump described in the present invention is an instant noodle lump produced through a frying step mentioned later. The fried noodle lump can be prepared according to a usual method. Specifically, sub materials and kneading water are added to a material powder such as wheat flour, and the mixture is kneaded and then rolled out, followed by being cut into noodle strings or extruded into noodle strings. Then, the noodle strings are gelatinized by steaming or boiling and, if necessary, flavored. The resulting noodle strings are then put in a retainer and dried by frying treatment to finish a fried noodle lump.

—Fried Noodle Lump Included in Cup-Shaped Container—

The fried noodle lump of the present invention may have various shapes and preferably has a shape similar to that of the opening (barrel) of the cup-shaped container mentioned above. Specifically, the noodle lump preferably has a round trunk for a round opening (barrel) and preferably has a trunk having a polygonal shape for an opening having the polygonal shape. In this way, the noodle lump is brought in contact with at least a portion of the barrel of the cup-shaped container so that the fried noodle lump can be prevented from being shaken in the cup-shaped container.

Figure 3A:
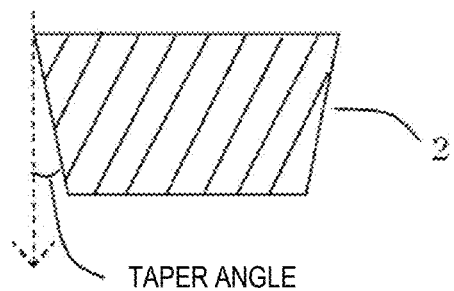
FIG. 3(a) is a schematic front view of a fried noodle lump.
Figure 3B:
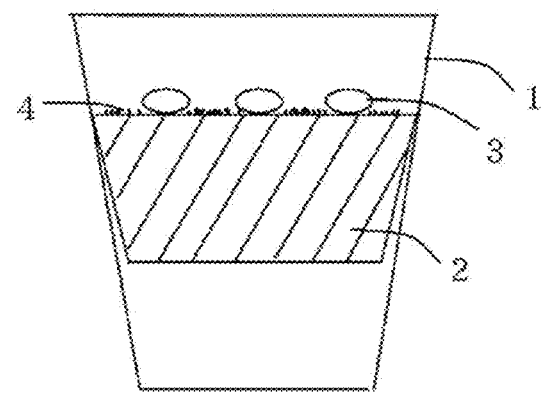
FIG. 3(b) is a schematic sectional view of a state where the fried noodle lump is stored in a cup-shaped container.

Particularly, when the cup-shaped container has a tapered structure, it is preferred that the fried noodle lump should be also prepared as a noodle lump having a similar tapered structure or a tapered structure with a taper angle slightly larger than that of the container, and in addition, that the fried noodle lump should be held at about the midpoint position of the cup-shaped container such that the lateral side of the noodle lump is in contact with the internal lateral side of the cup-shaped container (FIGS. 3(*a*) and 3(*b*)). Such a structure where the noodle lump (2) is kept floating in the cup-shaped container (1) without contacting the bottom of the container renders the noodle lump (2) fixed and less movable in the container (1) and improves the reconstitution of the noodle lump with hot water because hot water poured thereto spreads even to the underside of the noodle lump.

Ingredients (3) or soup (4) may be placed on the noodle lump (2), as a matter of course (FIG. 3(*b*)). FIG. 3(*b*) shows the case where soup in the form of powder is placed thereon. However, the present invention is not limited by these embodiments. Liquid or powdered soup separately included in a small bag may be attached to such cup noodles.

—Prevented from being Inverted in Cup by External Shock—

Instant cup noodles containing a fried noodle lump stored in a cup-shaped container may receive various shocks, for example, when transported. Examples of such a case include drop or shock during transport, etc., and drop during handling at shops.

In such a case, the fried noodle lump is moved within the container due to the fracture of a lower portion of the noodle lump by such unexpected physical shock from the outside of the container during distribution, etc., and therefore, so-called inversion may occur (i.e., the noodle lump may be inclined or the upper side and the underside may be reversed). If the noodle lump is inverted, dried ingredients, powdered soup, or the like added to the top of the noodle lump sink to space below the noodle lump. Thus, the ingredients are buried under noodles even after reconstitution. Therefore, the appearance at the time of eating is deteriorated. Particularly, in the case where the fried noodle lump is held at the midpoint position of the cup-shaped container such that the lateral side of the noodle lump is in contact with the internal lateral side of the cup-shaped container, the noodles are supposed to be eaten in a state where the ingredients or the like are placed on the surface of the noodle lump even after placement of the dried ingredients on the surface of the noodle lump and absorption of hot water. Therefore, it is preferred to avoid, if possible, the inclination or reversal of the noodle lump. The "inversion" mentioned above can be prevented by using the fried noodle lump produced by the production method according to the present invention.

As mentioned above, the term "inverted" or "inversion" described in the present invention includes not only a state where the upper side and underside of the noodle lump are reversed within a cup, but the case where the noodle lump is generally inclined at an angle of approximately 20° or larger with respect to a horizontal plane within a cup. It should be understood that such inclination is also included in the inversion of the present invention.

Next, the steps of producing the fried noodle lump of the present invention will be described.

—Gelatinization of Group of Noodle Strings—

In the present invention, a group of noodle strings after gelatinization is subjected to frying treatment. Specifically, sub materials and kneading water are added to a material powder such as wheat flour, and the mixture is kneaded and then rolled out, followed by being cut to prepare noodle strings. The noodle strings are gelatinized by a method such as steaming or boiling. Overheated steam or various other methods may be used for the gelatinization.

—Storing in Retainer—

The frying step is the step of drying the gelatinized noodle strings under oil heat by passing through an oil of approximately 120° C. to approximately 170° C. for approximately 1 minute to approximately 3 minutes.

Figure 4A:
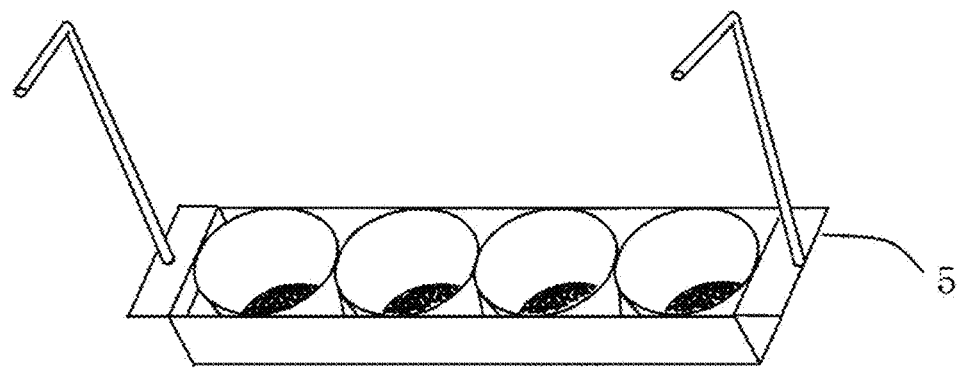
FIG. 4(a) is a perspective view of an exemplary retainer.
Figure 4B:
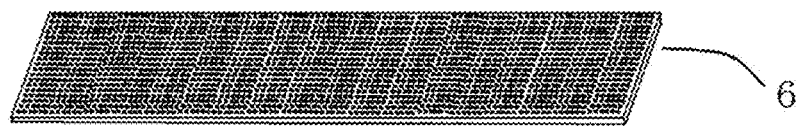
FIG. 4(b) is a perspective view of an exemplary lid.

In the frying step, a porous (fluid permeable) metal mold called retainer is used for storing the noodle strings and frying them as shown in FIG. 4(a). Various types can be used as the retainer. In general, the retainer body (5) is often constituted integrally such that a plurality of cup-shaped molds for storing noodle strings are arranged in succession. As shown in FIG. 4(b), a porous (fluid permeable) lid (6) is often used which is constituted integrally such that a plurality of lid members corresponding to the respective openings of the cup-shaped molds in the retainer body are arranged in succession.

The gelatinized group of noodle strings is stored in the retainer body (5), and the lid (6) is placed on the upper portion of the retainer body, which is then immersed in a fry oil for frying treatment. Within the retainer body, it is preferred that the group of noodle strings after gelatinization should be stored so as to occupy 60 to 80% or more of the capacity of each retainer container. A larger amount of the noodle strings stored facilitates flattening the upper side of the fried noodle lump in the case of immersing the whole retainer in a fry oil as mentioned later.

—Securing Shape Retention of Bottom End Portion of Fried Noodle Lump—

In the present invention, a flexible group of noodle strings is stored in a retainer, and the shape retention of a bottom end portion of the fried noodle lump is secured in the first place. This can prevent the fracture of a lower portion of the fried noodle lump against even external shock, and thereby prevent the so-called "inversion" phenomenon in which the noodle lump is moved within the container to thereby incline or reverse the upper side and the underside.

The method for securing the shape retention of a bottom end portion of the fried noodle lump is not particularly limited. Any treatment may be carried out as long as the shape retention of the bottom end portion is temporarily secured.

Figure 5:
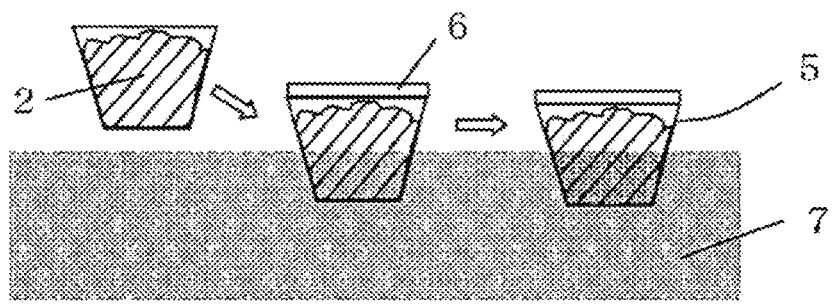
FIG. 5 is a schematic view showing a frying step in the case of immersing the lower portion of a retainer in a fry oil.

One example thereof includes a frying treatment method by the immersion of the lower portion of the retainer body (5) in a fry oil (7) as shown in FIG. 5. Specifically, the retainer body (5) containing the group of noodle strings is covered at its upper portion with a lid (6) in a state where the group of noodle strings (2) after gelatinization is stored therein, and in this state, the retainer body (5) is immersed in the fry oil (7). In this context, in the present invention, only the lower portion of the retainer body (5) is first immersed in the fry oil (7). In this case, it is preferred that the group of noodle strings (2) in the retainer body (5) should be fried without being released from the bottom of the retainer.

Instead of the method for immersing the lower portion of the retainer body in a fry oil as described above, the shape retention may be secured by spraying a fry oil of high temperature from below the retainer containing the group of noodle strings so that the fry oil is supplied via the holes disposed at the bottom of the retainer to fry the bottom end portion of the group of noodle strings.

These methods render the lower end portion of the fried noodle lump dense and secure the shape retention. The extent to which the lower portion of the retainer is immersed in a fry oil is not particularly limited and is preferably on the order of 10% to 80%, more preferably on the order of 30 to 70%, of the retainer height. Specifically, for a retainer having a depth on the order of 45 to 65 mm, it is generally preferred to immerse approximately 10 mm to approximately 40 mm thereof.

The frying time differs depending on the frying temperature of the fry oil, etc., and is generally 10 seconds to 60 seconds for a frying temperature of 140° C. to 180° C. The frying time is particularly preferably on the order of 20 seconds to 50 seconds, more preferably on the order of 20 seconds to 40 seconds.

In this way, the shape retention of the lower end portion of the fried noodle lump is secured by keeping, for the predetermined time, the state where the lower portion of the retainer is immersed in the fry oil. This step may be carried out by a method involving gradually immersing the retainer in the fry oil by a plurality of stages. A possible method involves, for example, immersing the lid-covered retainer containing the group of noodle strings in the fry oil stepwise by 5 to 15 mm deep at every predetermined time (on the order of 5 to 20 seconds) and eventually immersing the whole retainer in the fry oil, followed by frying for the predetermined time.

Instead of the stepwise manner, the retainer may be immersed gradually deeply in the fry oil to secure the shape retention of the lower end portion of the fried noodle lump after frying. A possible method involves, for example, immersing the retainer gradually deeply in the fry oil from the start of frying for approximately 5 seconds to approximately 40 seconds at a rate on the order of 1 to 5 mm/second. After the securing of the shape retention of the bottom end portion of the fried noodle lump, the whole noodle lump can be completely fried by various methods such as the immersion of the whole retainer in the fry oil or the pouring of a cascading fry oil from above. Various steps can be adopted after the securing of the shape retention of the bottom end portion of the fried noodle lump.

Figure 6:
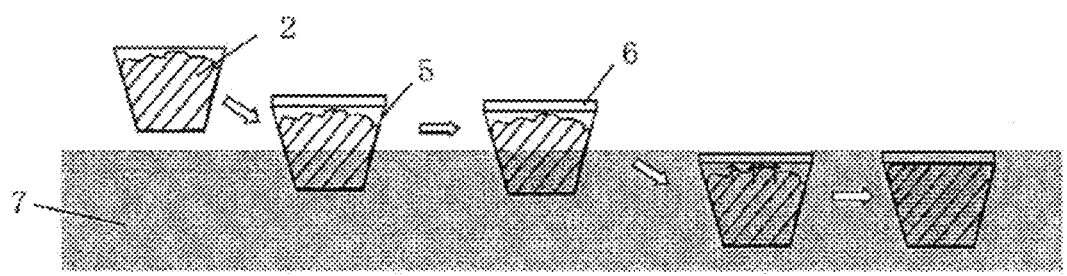
FIG. 6 is a schematic view showing a frying step in the case of immersing the lower portion of a retainer in a fry oil and then immersing the whole retainer in the fry oil for frying.

In the case of immersing the whole retainer in the fry oil, it is preferred for the group of noodle strings stored in the retainer that the fry oil-unimmersed upper portion of the group of noodle strings should be moved upward within the retainer during frying and fried while forming the flat portion by the lid members (FIG. 6).

The adoption of the production method according to the present invention can also exert the effect of being able to shorten the frying time of the fried noodle lump.

Specifically, as shown in FIG. 6, the retainer body (5) is wholly immersed in the fry oil so that the group of noodle strings (2) is fried while moved upward and pressed against the lid (6) placed on the upper portion of the retainer to form a flat portion by the lid (6). In this case, the already fried lower end portion of the fried noodle lump (2) having the shape retention may also be moved upward. Any movement of the group of noodle strings is acceptable as long as the shape retention of the lower end portion is secured.

—Inclusion in Cup-Shaped Container—

As for the fried noodle lump produced by the production method mentioned above, the lid is removed, and the fried noodle lump after frying is then taken out of the retainer body. Various methods may be used for taking out the fried noodle lump. In the case of continuous lines, the retainer may be turned upside down to separate the noodle lump from the retainer, or the separation from the retainer may be promoted by applying shock while turning the retainer upside down.

The fried noodle lump separated from the retainer is stored in a cup-shaped container. As mentioned above, in this case, it is preferred that the noodle lump should be kept floating in the barrel of the cup-shaped container.

Then, dried ingredients and powdered soup or separately packaged liquid soup are stored therein, and the upper portion is covered with a lid by heat sealing or the like to finish instant cup noodles.

The instant cup noodles thus finished may be appropriately packaged with a shrink film made of polypropylene, polyethylene, or the like, as a matter of course.

EXAMPLES

Hereinafter, the present invention will be described with reference to Examples. However, the present invention is not intended to be limited by these Examples.

Example 1

Production Method of the Present Invention

Four metal cup-shaped molds produced in advance were lined in succession (tetraplex) in a rectangular frame for a retainer body. The frame was welded to adjacent portions of the cup-shaped molds to prepare a retainer body. The cup-shaped molds in the retainer body each had an opening of 90 mm in inside diameter, a bottom of 74.2 mm in inside diameter, and a depth of 62 mm with a large number of pores disposed at the bottom.

The gelatinized noodle strings used were prepared as follows: 10 parts by weight of wheat flour and 1 part by weight of starch were mixed. 340 ml of water containing common salt, kansui, etc., dissolved therein was added per kg of the powder, and the mixture was kneaded, compounded, and rolled out. The obtained noodle band was cut into noodle strings with an 18th angle cutting blade. The noodle strings were steamed for approximately 2 minutes, then cut, and supplemented with a flavoring solution containing common salt to prepare 100 g of gelatinized noodle strings.

The gelatinized noodle strings (100 g) were stored in the retainer body, which was then covered with a metal lid. The retainer body covered with the lid was immersed in a fry oil in a fryer having a temperature of 150° C. such that the lower portion of the retainer body immersed in the fry oil was approximately 30 mm from the underside of the retainer body. This state was kept for 30 seconds. Then, the retainer body was immersed in the fry oil such that the lid on the retainer body was also put in the fry oil. This state was kept for approximately 1 minute and 40 seconds for frying treatment to prepare a fried noodle lump.

The prepared fried noodle lump was stored in a polypropylene cup-shaped container having an opening of 96 mm in inside diameter, a bottom of 68 mm in inside diameter, and a height of 107 mm. The upper portion was covered with a lid containing paper and aluminum layers and sealed by heat sealing to prepare instant cup noodles.

Comparative Example 1

Comparative Example 1 was carried out in the same way as in Example 1 except that after the storing of the noodle strings, the retainer body for frying was wholly immersed in the fry oil and immersed for approximately 2 minutes and 10 seconds for frying to prepare a fried noodle lump.

—Test Method—

Ten samples of the instant cup noodles produced by each of the methods of Comparative Example 1 and Example 1 were each dropped from a height of 30 cm to the floor in a state where each side faced down in order of underside→right lateral side→left lateral side→upper side to forcedly apply shocks thereto. A similar cycle was further carried out twice to forcedly apply a total of 12 shocks thereto. Next, all of the lids of the instant cup noodle samples were opened, and the state of the noodle lump stored within each sample was examined. The evaluation was conducted according to the following 3 criteria:

Good: The noodles were not inclined.

Fair: The noodles were inclined in the cup (20° or larger with respect to a horizontal plane).

Poor: The noodles were largely inclined so as at least to be almost laid on its side (50° or larger with respect to a horizontal plane).

Of the 10 samples, the number of samples that fell within each criterion is shown in Table 1 below.

TABLE 1

| State of inclination of noodles | Example 1 | Comparative Example 1 |
| --- | --- | --- |
| Good | 10 | 0 |
| Fair | 0 | 5 |
| Poor | 0 | 5 |

The fried noodle lump of Example 1 was found to be drastically prevented from being inclined or laid on its side within the cup as compared with Comparative Example 1.

The present application claims priority of Japanese Patent Application No. 2013-212144 filed on Oct. 9, 2013, the contents of which are incorporated herein by reference.

The invention claimed is:

1. A method for producing a fried noodle lump, which is capable of preventing an inversion thereof by an external shock during distribution of the fried noodle lump in a cup-shaped container having a tapered structure, in which the fried noodle lump is stored and held around a midpoint position of the cup-shaped container and contacts an internal lateral side of the cup-shaped container, wherein a width of the cup-shaped container having the tapered structure gradually becomes larger toward an opening of the container from a bottom thereof, the method comprising:

gelatinizing a lump of noodle strings;

storing the lump of the gelatinized noodle strings in an unfried state in a retainer, the retainer having a tapered structure that becomes larger toward an opening of the retainer from a bottom thereof; and placing in fry oil, only a lower part of the retainer at a side of the bottom thereof so that only a lower part of the lump of the gelatinized noodle strings is immersed in the fry oil, and that only the lower part of the lump of the gelatinized noodle strings in the retainer is fried without the lump of the gelatinized noodle strings being totally released from the bottom of the retainer, so that a shape of a bottom end portion of the lump of the gelatinized noodle strings is retained, wherein the lower part of the lump of the gelatinized noodle strings is configured to be oriented toward a bottom side of the cup-shaped container, wherein in the placing in fry oil, when only the lower part of the retainer is placed in the fry oil, the retainer is in an upright position in which the lower part of the retainer is immersed in the fry oil while a lid on the opening of the retainer is outside the fry oil, a time of the frying of only the lower part of the lump of the gelatinized noodle strings is in a range from 10 seconds to 60 seconds, and the retainer is a liquid permeable metal mold in which the lump of the gelatinized noodle strings is stored during frying of the lump of the gelatinized noodle strings.

2. The method for producing the fried noodle lump according to claim 1, further comprising immersing a whole portion of the retainer including the lump of the gelatinized noodle strings in fry oil, after the frying of the only lower part of the lump of the gelatinized noodle strings.

3. The method for producing the fried noodle lump according to claim 1, wherein the placing comprises immersing the retainer in the fry oil in a stepwise manner.

4. The fried noodle lump produced by the production method according to claim 1.

5. The fried noodle lump produced by the production method according to claim 1, wherein a temperature of the frying of only the lower part of the lump of the gelatinized noodle strings is in a range from 140° C. to 180° C.

6. The fried noodle lump produced by the production method according to claim 1, wherein the lower part of the retainer placed in the fry oil is a portion in a range from 10% to 80% of the retainer measured from the bottom of the retainer.

7. The fried noodle lump produced by the production method according to claim 2.

8. The method for producing the fried noodle lump according to claim 2, further comprising transferring the fried noodle lump the whole portion of which has been fried, from the retainer to the cup-shaped container.

9. A method for producing a fried noodle lump, which is capable of preventing an inversion thereof by an external shock during distribution of the fried noodle lump in a cup-shaped container having a tapered structure and a flat top portion, in which the fried noodle lump is stored and held around a midpoint position of the cup-shaped container and contacts an internal lateral side of the cup-shaped container, wherein a width of the cup-shaped container having the tapered structure gradually becomes larger toward an opening of the container from a bottom thereof, the method comprising:

gelatinizing a lump of noodle strings;

storing the lump of the gelatinized noodle strings in an unfried state in a retainer, the retainer having a tapered structure that becomes larger toward an opening of the retainer from a bottom thereof;

placing a lid on the opening of the retainer;

placing in fry oil, only a lower part of the retainer at a side of the bottom thereof in a range from 10% to 80% of the retainer measured from the bottom of the retainer so that only a lower part of the lump of the gelatinized noodle strings is immersed in the fry oil, and that only the lower part of the lump of the gelatinized noodle strings in the retainer is fried, so that a shape of a bottom end portion of the lump of the gelatinized noodle strings is formed, wherein the lower part of the lump of the gelatinized noodle strings is configured to be oriented toward a bottom side of the cup-shaped container; and immersing a whole portion of the retainer including the lump of the gelatinized noodle strings in the fry oil, after the frying of only the lower part of the lump of the gelatinized noodle strings, so that the lump of the gelatinized noodle strings is moved upward and pressed against the lid so as to form a flat top portion of the lump of the gelatinized noodle strings by the lid, wherein in the placing in fry oil, when only the lower part of the retainer is placed in the fry oil, the retainer is in an upright position in which the lower part of the retainer is immersed in the fry oil while the lid on the opening of the retainer is outside the fry oil, and the retainer is a liquid permeable metal mold in which the lump of the gelatinized noodle strings is stored during frying of the lump of the gelatinized noodle strings.

\* \* \* \* \*